(12) United States Patent
Su et al.

(10) Patent No.: US 10,776,570 B2
(45) Date of Patent: Sep. 15, 2020

(54) SUPPORTING DIGITAL INK IN MARKUP LANGUAGE DOCUMENTS

(71) Applicant: Microsoft Technology Licensing, LLC, Redmond, WA (US)

(72) Inventors: Fei Su, Issaquah, WA (US); Eric C. Brown, Seattle, WA (US); Xiao Tu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1207 days.

(21) Appl. No.: 14/618,303

(22) Filed: Feb. 10, 2015

(65) Prior Publication Data

US 2016/0232146 A1 Aug. 11, 2016

(51) Int. Cl.
| | |
|---|---|
| *G06F 40/171* | (2020.01) |
| *G06F 3/0354* | (2013.01) |
| *G06F 3/0488* | (2013.01) |
| *G06F 3/0484* | (2013.01) |
| *G06F 3/14* | (2006.01) |
| *G06F 40/14* | (2020.01) |

(52) U.S. Cl.
CPC ........ *G06F 40/171* (2020.01); *G06F 3/03545* (2013.01); *G06F 3/04842* (2013.01); *G06F 3/04883* (2013.01); *G06F 3/1454* (2013.01); *G06F 40/14* (2020.01)

(58) Field of Classification Search
CPC .................................................. G06F 17/242
See application file for complete search history.

(56) References Cited

U.S. PATENT DOCUMENTS

| 7,262,785 B2* | 8/2007 | Silverman ........... G06F 3/04883 345/156 |
| 2004/0190092 A1* | 9/2004 | Silverbrook ........ G06F 3/03545 358/539 |

(Continued)

FOREIGN PATENT DOCUMENTS

| CN | 1656473 A | 8/2005 |
| EP | 1610230 A2 | 12/2005 |

OTHER PUBLICATIONS

"International Search Report and Written Opinion Issued in PCT Application No. PCT/US2016/015872", dated Apr. 28, 2016, 11 Pages.

(Continued)

*Primary Examiner* — William L Bashore
*Assistant Examiner* — Nathan K Shrewsbury
(74) *Attorney, Agent, or Firm* — Fiala & Weaver P.L.L.C.

(57) ABSTRACT

An application on a computing device includes a digital ink system that supports the input and output of digital ink in a markup language document. Digital ink refers to a digital representation of object (e.g., pen or finger) strokes on an input device that can be displayed on an output device. The markup language document can include, for example, an edit box in which the digital ink and optionally other data can be input. As the input object moves over the input device, data identifying the locations of the input object are captured and embedded in a markup language element of the document. The digital ink system also allows documents including digital ink to be displayed, the digital ink system displaying the digital ink along with any other data included in the document.

20 Claims, 7 Drawing Sheets

(56) References Cited

U.S. PATENT DOCUMENTS

| | | | |
|---|---|---|---|
| 2005/0041866 A1* | 2/2005 | Silverman | G06F 3/04883 382/188 |
| 2005/0052433 A1 | 3/2005 | Silverman et al. | |
| 2005/0289452 A1* | 12/2005 | Kashi | G06F 17/2247 715/232 |
| 2006/0050969 A1* | 3/2006 | Shilman | G06F 3/04883 382/224 |
| 2007/0022371 A1* | 1/2007 | Bargeron | G06F 3/04883 715/205 |
| 2007/0283240 A9 | 12/2007 | Bargeron | |
| 2008/0229186 A1* | 9/2008 | Gear | G06T 19/00 715/233 |
| 2010/0171754 A1* | 7/2010 | Hatfield | G06K 9/00416 345/619 |
| 2010/0172590 A1 | 7/2010 | Foehr et al. | |
| 2013/0339459 A1 | 12/2013 | Kumashio | |
| 2014/0173393 A1 | 6/2014 | Roy et al. | |

OTHER PUBLICATIONS

Ramachandran, et al., "An Architecture for Ink Annotations on Web Documents", In Proceedings of Seventh International Conference on Document Analysis and Recognition, Aug. 3, 2003, pp. 256-260.

"How to Save Ink Data (HTML)", Retrieved From: <http://msdn.microsoft.com/en-us/library/windows/apps/hh700421.aspx> Aug. 20, 2014, 10 Pages.

"InkEdit Class", Retrieved From: <http://msdn.microsoft.com/en-us/library/windows/desktop/ms835842.aspx> Aug. 20, 2014, 16 Pages.

"Windows.UI.Input.Inking Namespace", Retrieved From: <http://msdn.microsoft.com/en-us/library/windows/apps/windows.ui.input.inking.aspx> Aug. 20, 2014, 2 Pages.

"Ink Collection", Retrieved From: <http://msdn.microsoft.com/en-us/library/windows/desktop/ms839539.aspx> Aug. 20, 2014, 2 Pages.

"Word 2007: Rich Text Format (RTF) Specification", Retrieved From: <http://www.microsoft.com/en-us/download/details.aspx?id=10725> Aug. 20, 2014, Mar. 20, 2008, 4 Pages.

"Ink Serialization Sample", Retrieved From: <http://msdn.microsoft.com/en-us/library/windows/desktop/ms698127(v=vs.85).aspx> Aug. 20, 2014, Mar. 6, 2012, 4 Pages.

"Ink Serialized Format Specification", Available at: <https://www.google.co.in/url?sa=t&rct=j&q=&esrc=s&source=web&cd=1&cad=rja&uact=8&ved=0CBsQFjAA&url=http%3A%2F%2Fdownload.microsoft.com%2Fdownload%2F5%2F0%2F1%2F501ED102-E53F-4CE0-AA6B-B0F93629DDC6%2FSupportingTechnologies%2FInkSerializedForm, 2007, 49 Pages.

Belenkaia, et al., "Creation, Presentation, Capture, and Replay of Freehand Writings in e-Lecture Scenarios", In Proceedings: ED-Media— World Conference on Educational, Multimedia, Hypermedia & Telecommunications, Jun. 21, 2004, 34 Pages.

Chaudhury, et al., "Handwriting Based Interface for Communication", In Proceedings: The First international conference on Expressive Interactions for Sustainability and Empowerment, Oct. 29, 2009, 5 Pages.

Chee, et al., "Ink Markup Language", Retrieved From: <http://www.w3.org/TR/InkML/> Aug. 20, 2014, Sep. 20, 2011, 55 Pages.

Constantino "Improving e-Learning Environments for Pen and Multi-Touch Based Interaction", In Proceedings: The Sixth International Conference on Mobile, Hybrid, and On-line Learning, Mar. 23, 2014, 7 Pages.

Harit, et al., "Patra: A Novel Document Architecture for Integrating Handwriting with Audio-Visual Information", In Proceedings: The 9th International Conference on Document Analysis and Recognition, Sep. 23, 2007, 5 Pages.

Li, et al., "Digital Ink Representation of Handwriting Scripts by F_Tablet based on InkML", In Proceedings: The IEEE International Conference on Information Acquisition, Aug. 20, 2006, 6 Pages.

Neddenriep, et al., "RiverInk—An Extensible Framework for Multimodal Interoperable Ink", In Proceedings: The 40th Hawaii International Conference on System Sciences, Jan. 2007, 10 Pages.

Regmi, et al., "A Collaborative Interface for Multimodal Ink and Audio Documents", In Proceedings: The 10th International Conference on Document Analysis and Recognition, Jul. 26, 2009, 5 Pages.

Sutherland, "vsInk: An Extensible Framework for Adding Digital Ink to Visual Studio", In Dissertation of Degree of Bachelor Science in Computer Science at the University of Auckland, Oct. 2012, 51 Pages.

"International Preliminary Report on Patentability", Application No. PCT/US2016/015872, dated May 22, 2017, 7 pages.

"Office Action Issued in Chinese Patent Application No. 201680009701.9", dated Nov. 22, 2019, 30 Pages.

\* cited by examiner

SUPPORTING DIGITAL INK IN MARKUP LANGUAGE DOCUMENTS

BACKGROUND

As computing technology has advanced, many different types of computing devices have become available, such as laptop computers, tablet computers, smart phones, and so forth. Some of these devices accept inputs allowing a user to write or draw on the devices, for example by using a pen or finger to write a word. Although many users like the ability to write or draw on the devices, allowing such inputs is not without its problems. One such problem is that it can be difficult to incorporate the data provided by such inputs into a document being edited or created by the user, leading to user frustration with their devices.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, digital ink user input for a markup language document is received by an application. A digital ink markup language element that includes data describing the digital ink user input is generated, and the digital ink markup language element is embedded in the markup language document. The markup language document also includes in one or more additional elements additional data describing additional content to be displayed when displaying the markup language document. The markup language document with the digital ink markup language element is transmitted to a storage device.

In accordance with one or more aspects, a storage device is accessed to obtain a markup language document, the markup language document including a digital ink markup language element as well as one or more additional elements including additional data. Data describing the digital ink of the markup language document is extracted from the digital ink markup language element, and additional data describing the additional content of the markup language document is extracted from the one or more additional elements. The digital ink as well as the additional content are displayed as a visual representation of the markup language document.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Supporting digital ink in markup language documents is discussed herein. Digital ink refers to a digital representation of object (e.g., pen or finger) strokes on an input device that can be displayed on an output device. The digital ink is analogous to strokes created by a traditional pen or pencil, although the strokes are displayed on the output device rather than ink or graphite being deposited on paper or some other writing surface. The digital ink, when displayed, is also referred to as a digital ink stroke.

An application on a computing device includes a digital ink system that supports the input and output of digital ink in a markup language document. The markup language document can include, for example, an edit box in which the digital ink and optionally other data can be input. As the input object (e.g., pen or finger) moves over the input device, data identifying the locations of the input object are captured and embedded in a markup language element of the document. The digital ink system also allows documents including digital ink to be displayed, the digital ink system displaying the digital ink along with any other data included in the document. The computing device also supports cutting and pasting of digital ink, allowing digital ink included in one document to be copied and pasted to another document.

The digital ink is embedded in the markup language document by including the digital ink as a markup language element of the document. This embedding of the digital ink in the markup language document allows the digital ink to be stored as part of the same document as any other data included in the document rather than creating a separate file to store the digital ink. This allows the data for the document to be included in a single file, reducing the complexity of computing devices and file systems by alleviating the need to track which files are associated with which other files to generate the document. The use of the single file also reduces bandwidth requirements as additional file overhead for multiple files need not be maintained, thus reducing storage space on the storage device, reducing the bandwidth used when transferring the document between devices over a network, and so forth.

Furthermore, this embedding of the digital ink in the markup language document allows the digital ink to be involved in document reflow or layout. The digital ink can be positioned in various locations on a display, analogous to other content in the document. In contrast to the digital ink being treated as an overlay, the position of the displayed digital ink can be determined based on the locations of other document content that is displayed, and the position of other displayed document content can be determined based on the location of the digital ink.

Figure 1:
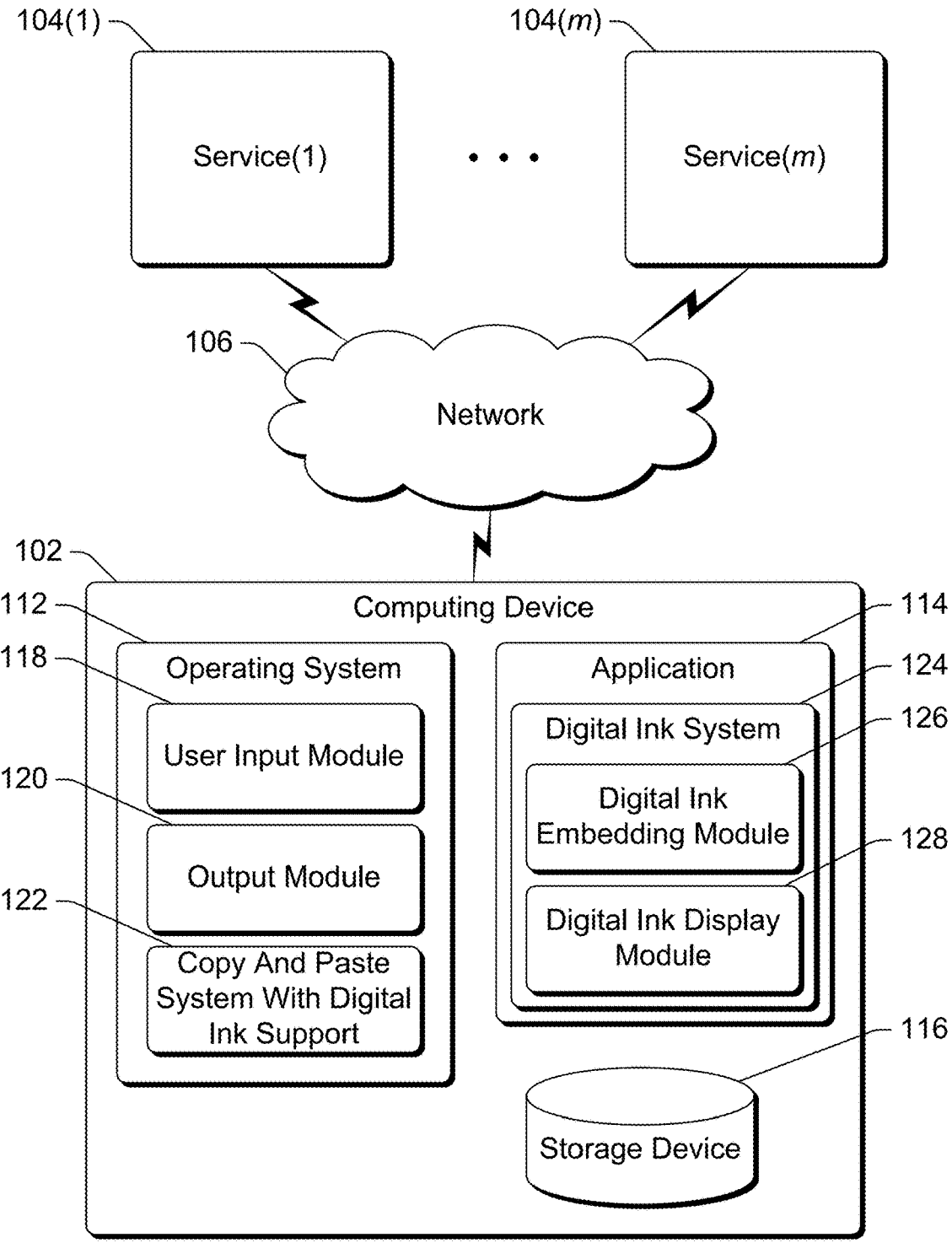
FIG. 1 illustrates an example system implementing the supporting digital ink in markup language documents in accordance with one or more embodiments.

FIG. 1 illustrates an example system 100 implementing the supporting digital ink in markup language documents in accordance with one or more embodiments. System 100 includes a computing device 102 that can communicate with one or more (m) services 104 via a network 106. Network 106 can be a variety of different networks, including the Internet, a local area network (LAN), a phone network (e.g., public telephone, cellular, satellite, etc.), an intranet, other public and/or proprietary networks, combinations thereof, and so forth.

Computing device 102 can be any of a variety of different types of devices, such as a desktop computer, a server computer, a laptop or netbook computer, a mobile device (e.g., a tablet or phablet device, a cellular or other wireless phone (e.g., a smart phone), a notepad computer, a mobile station), a wearable device (e.g., eyeglasses, watch), an entertainment device (e.g., an entertainment appliance, a set-top box communicatively coupled to a display device, a game console), a television or other display device, an automotive computer, and so forth. Thus, computing device 102 may range from a full resource device with substantial memory and processor resources (e.g., personal computers, game consoles) to a low-resource device with limited memory and/or processing resources (e.g., traditional set-top boxes, hand-held game consoles).

Each service 104(1), . . . , 104(m) is implemented by one or more of a variety of different types of devices, ranging from full resource devices with substantial memory and processor resources to low-resource devices with limited memory and/or processing resources analogous to the computing device 102. Each service 104(1), . . . , 104(m) maintains documents that are obtained and/or saved by the computing device 102, as discussed in more detail below.

The computing device 102 includes an operating system 112, an application 114, and a storage device 116. The operating system 112 includes a user input module 118, an output module 120, and a copy and paste system 122 with digital ink support. The copy and paste system 122 allows data that includes digital ink to be copied from one application or document to another application or document, as discussed in more detail below.

The user input module 118 receives user inputs from a user of the computing device 102. User inputs can be provided in a variety of different manners, such as by pressing one or more keys of a keypad or keyboard of the device 102, pressing one or more keys of a controller (e.g., remote control device, mouse, track pad, etc.) of the device 102, pressing a particular portion of a touchpad or touchscreen of the device 102, making a particular gesture on a touchpad or touchscreen of the device 102 (e.g., with a finger, pen, or other object), and/or making a particular gesture on a controller (e.g., remote control device, mouse, track pad, etc.) of the device 102 (e.g., with a finger, pen, or other object). User inputs can also be provided via other physical feedback input to the device 102, such as tapping any portion of the device 102, an action that can be recognized by a motion detection or other component of the device 102 (such as shaking the device 102, rotating the device 102, bending or flexing the device 102, etc.), and so forth. User inputs can also be provided in other manners, such as via voice or other audible inputs to a microphone, via motions of hands or other body parts observed by an image capture device, and so forth.

The user input module 118 can receive digital ink user input from a user in any of the manners discussed above in which user inputs can be received. For example, digital ink user input can be provided by a user moving an object (e.g., a finger or stylus) across a touchscreen, touchpad, and so forth. By way of another example, digital ink user input can be provided by a user moving a mouse or other cursor control device. By way of yet another example, digital ink user input can be provided by a user moving a pen, stylus, or other device that senses its own location or movement over time and provides indications of such locations or movements to the user input module 118.

The output module 120 generates, manages, and/or outputs content for display, playback, and/or other presentation. This content can be created by the output module 120 or obtained from other modules or applications of the computing device 100 such as the application 114. This content can be, for example, a display or playback portion of a user interface (UI). The content can be displayed or otherwise played back by components of the computing device 100 (e.g., speakers, interactive display devices, etc.). Alternatively, the output module 120 can generate one or more signals that are output to other devices or components (e.g., speakers, display devices, etc.) that are separate from the computing device 100.

The application 114 is an application or program that displays or otherwise presents data stored in documents. In one or more embodiments, the application 114 is a Web browser that obtains documents from various services 104 via the network 106. Although a single application is illustrated in FIG. 1, it should be noted that the computing device 102 can include any number of applications analogous to the application 114. The application 114 can be implemented as a separate application run by the operating system 112, or alternatively can be implemented as at least part of the operating system 112. A document refers to a file or other type of data structure that stores various types of electronic content that can be displayed or otherwise presented by the computing device 102. A document is typically written in a markup language, such as eXtensible Markup Language (XML) or HyperText Markup Language (HTML). The document can also include content written in other languages, such as JavaScript, Cascading Style Sheets (CSS), and so forth.

In one or more embodiments, the application 114 obtains documents from sources local to the computing device 102, such as the storage device 116. Additionally or alternatively, the application 114 can obtain documents from documents from various services 104 via the network 106. The application 114 can also optionally generate documents that are stored locally at the computing device 102 (e.g., in the storage device 116) and/or remotely (e.g., at a service 104).

The application 114 includes a digital ink system 124 that supports the use of digital ink in documents. The digital ink system 124 includes a digital ink embedding module 126 that manages embedding digital ink in documents, and a digital ink display module 128 that manages the display of digital ink embedded in documents.

Figure 2:
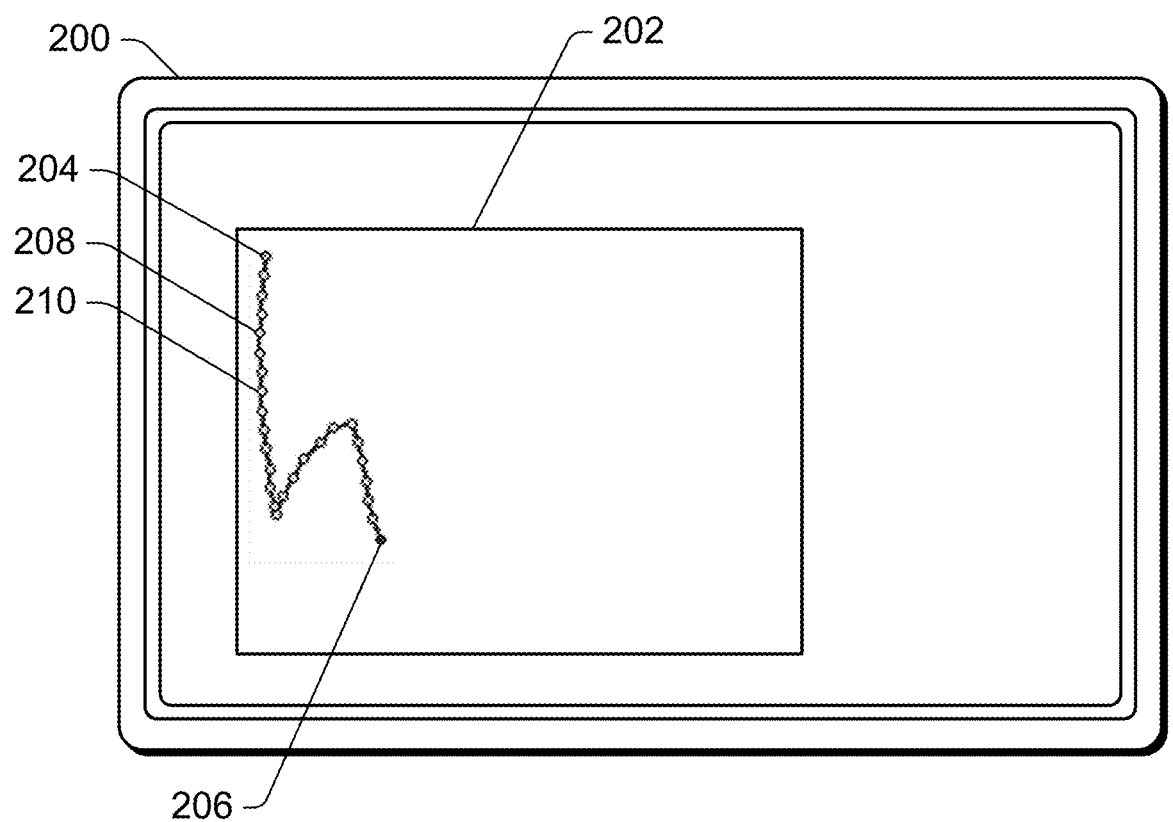
FIG. 2 illustrates an example of digital ink in accordance with one or more embodiments.

FIG. 2 illustrates an example of digital ink in accordance with one or more embodiments. FIG. 2 illustrates an example display 200 including an edit box 202 in which digital ink and optionally additional data can be input by a user. In the illustrated example of FIG. 2, the letter "h" has been input in the edit box 202 as digital ink, and the digital ink stroke that is the letter "h" is displayed in the edit box 202. Data representing the digital ink is collected, such as the locations of the object (e.g., pen or finger) as the object was moved across the input device, these locations illustrated as circles along the letter "h". For example, circle 204 is the location at the start of the letter "h", circle 206 is the location at the end of the letter "h", and circles 208 and 210 (as well as additional circles as illustrated) are locations along the stroke creating the letter "h".

Table 1 illustrates an example of the data identifying the locations along the stroke creating the letter "h" in accordance with one or more embodiments.

TABLE I

```
<trace>
    10 0, 9 14, 8 28, 7 42, 6 56, 6 70, 8 84, 8 98, 8 112, 9 126, 10 140,
    13 154, 14 168, 17 182, 18 188, 23 174, 30 160, 38 147, 49 135,
    58 124, 72 121, 77 135, 80 149, 82 163, 84 177, 87 191, 93 205
</trace>
```

The Table 1 includes a series of coordinates that identify the location on the screen (or within the edit box 202) of the stroke at particular times as the letter "h" is being drawn, illustrated as a "trace" element. In one or more embodiments the coordinates are coordinates in the Cartesian coordinate system, although other coordinate systems can alternatively be used. The coordinates can be captured at regular or irregular intervals. These locations are also referred to as data describing the digital ink.

Returning to FIG. 1, in one or more embodiments, the data describing digital ink complies with the "Ink Markup Language (InkML)" W3C Recommendation (Sep. 20, 2011). However, it should be noted that the data complying with the InkML W3C Recommendation is an example, and in alternative embodiments the data does not comply with the InkML W3C Recommendation (e.g., the data can comply with other public or proprietary standards).

For a received digital ink user input, the digital ink embedding module 126 generates a digital ink markup language element that includes the data describing the digital ink user input. The data describing the digital ink user input includes locations along the stroke of the digital ink user input as discussed above. The data describing the digital ink user input can also include various additional information, such as data identifying an input source (e.g., pen or finger), data identifying a brush setting indicating the width or other characteristics of the line that is drawn, data identifying a semantic meaning of the digital ink (e.g., a character or word recognized by the application 114 or the operating system 112 based on the digital ink user input), data identifying a user that input the digital ink (e.g., the user logged into the computing device 102 at the time when the digital ink user input was received), a timestamp of the digital ink strokes (e.g., allowing the digital ink to be subsequently displayed at a same timing or rate as the digital ink user input was received), and so forth. This additional information can be automatically determined by the application 114 or the operating system 112, can be input by user selection, and so forth.

In one or more embodiments, an "ink" tag is defined and used to identify the digital ink markup language element in the document. Table II illustrates an example of a markup language document with embedded digital ink.

TABLE II

| line | document data |
|---|---|
| 1: | <!DOCTYPE html> |
| 2: | <html lang="en"> |
| 3: |   <head> |
| 4: |     <meta charset="utf-8"> |
| 5: |     <title>Example of InkML embedded in an HTML5 file</title> |
| 6: |   </head> |
| 7: |   <body> |
| 8: |     <h1>Example of InkML embedded in an HTML5 file</h1> |
| 9: |     <p> |
| 10: |       This is a handwritten "h": |
| 11: |       <ink> |
| 12: |         <trace> |
| 13: |           10 0, 9 14, 8 28, 7 42, 6 56, 6 70, 8 84, 8 98, 8 112, 9 |
| 14: |           126, 10 140, 13 154, 14 168, 17 182, 18 188, 23 174, |
| 15: |           30 160, 38 147, 49 135, 58 124, 72 121, 77 135, 80 |
|  |           149, 82 163, 84 177, 87 191, 93 205 |
| 16: |         </trace> |
| 17: |       </ink> |
| 18: |     </p> |
| 19: |   </body> |
| 20: | </html> |

Table II includes a digital ink markup language element at lines 11-17, specified using an "ink" tag. The digital ink markup language element begins with "<ink>" at line 11 and ends with "</ink>" at line 17. Within the digital ink markup language element is the "trace" element (at lines 12-16) that includes a series of coordinates that identify the location on the screen (or within the edit box) of the stroke at particular times as the letter "h" is being drawn as discussed above.

The example in Table II includes a "trace" element including a series of coordinates. One or more additional elements including data identifying various additional information can also be included within the digital ink markup language element. For example, an element including data identifying an input source can be included in the digital ink markup language element, an element including data identifying a brush setting indicating the width or other characteristics of the line that is drawn can be included in the digital ink markup language element, an element including data identifying a semantic meaning of the digital ink can be included in the digital ink markup language element, an element including data identifying a user that input the digital ink, an element including a timestamp of the digital ink strokes (e.g., a timestamp for the beginning of each of multiple characters, a timestamp for each location along an ink stroke (e.g., for each set of coordinates captured as illustrated in Table I, a timestamp indicating a time when that set of coordinates was captured or identified)), and so forth.

In one or more embodiments, various additional data describing additional types of content other than digital ink can be included in the document, such as text, audio, video, and so forth. This additional data can be included in one or more additional elements of the document.

Figure 3:
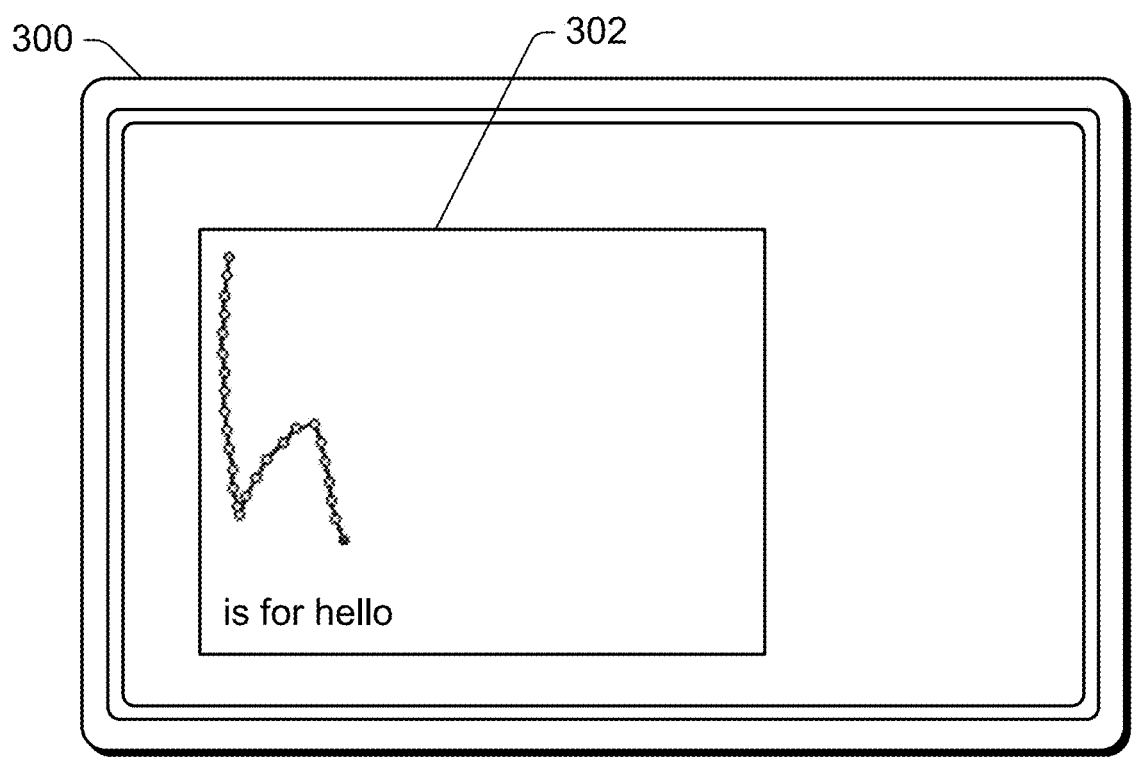
FIG. 3 illustrates an example of digital ink and additional data input in accordance with one or more embodiments.

FIG. 3 illustrates an example of digital ink and additional data input in accordance with one or more embodiments. FIG. 3 illustrates an example display 300 including an edit box 302 in which digital ink and additional data can be input. In the illustrated example of FIG. 3, the letter "h" has been input in the edit box 302 as digital ink, and the phrase "is for hello" has been input in the edit box 302 as text input. The text input can be input in various manners, such as using a keyboard. Data representing the digital ink is collected analogous to the discussion above regarding FIG. 2, and included in a digital ink markup language element of the document. Data representing the text input is also collected and included in an additional markup language element of the document.

Table III illustrates an example of a markup language document with embedded digital ink as well as additional data.

TABLE III

| line | document data |
|---|---|
| 1: | `<!DOCTYPE html>` |
| 2: | `<html lang="en">` |
| 3: | `<head>` |
| 4: | `<meta charset="utf-8">` |
| 5: | `<title>Example of InkML embedded in an HTML5 fle</title>` |
| 6: | `</head>` |
| 7: | `<body>` |
| 8: | `<h1>Example of InkML embedded in an HTML5 file</h1>` |
| 9: | `<p>` |
| 10: | This is a handwritten "h": |
| 11: | `<ink>` |
| 12: | `<trace>` |
| 13: | 10 0, 9 14, 8 28, 7 42, 6 56, 6 70, 8 84, 8 98, 8 112, 9 |
| 14: | 126, 10 140, 13 154, 14 168, 17 182, 18 188, 23 174, |
| 15: | 30 160, 38 147, 49 135, 58 124, 72 121, 77 135, 80 |
| | 149, 82 163, 84 177, 87 191, 93 205 |
| 16: | `</trace>` |
| 17: | `</ink>` |
| 18: | is for hello |
| 19: | `</p>` |
| 20: | `</body>` |
| 21: | `</html>` |

Table III includes a digital ink markup language element at lines 11-17, specified using an "ink" tag. The digital ink markup language element begins with "<ink>" at line 11 and ends with "</ink>" at line 17. Within the digital ink markup language is the "trace" element (at lines 12-16) that includes a series of coordinates that identify the location on the screen (or within the edit box) of the stroke at particular times as the letter "h" is being drawn as discussed above. Table III also includes data describing the additional content to be displayed (the text "is for hello") at line 18. The data describing the additional content is an additional element (a paragraph element) that also includes the digital ink markup language element.

Figure 4:
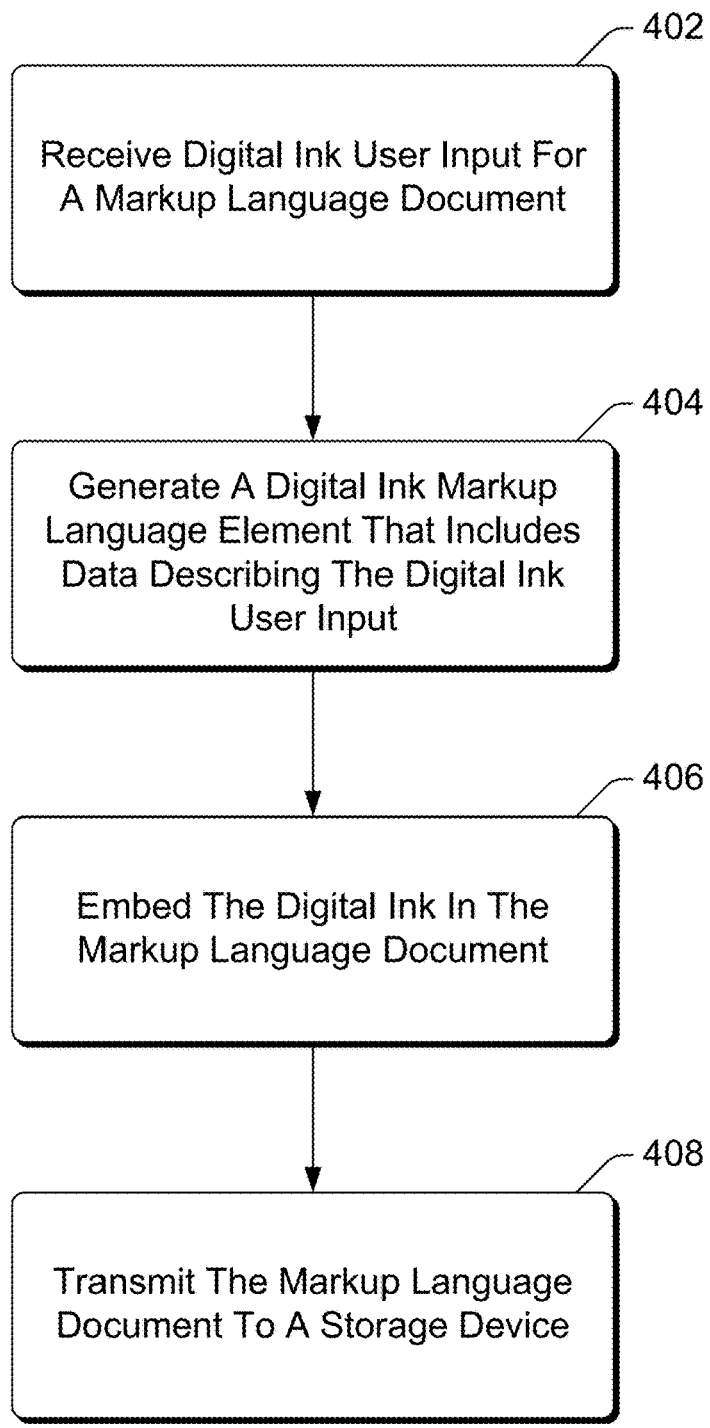
FIG. 4 is a flowchart illustrating an example process for adding digital ink to a markup language document in accordance with one or more embodiments.

FIG. 4 is a flowchart illustrating an example process 400 for adding digital ink to a markup language document in accordance with one or more embodiments. Process 400 is carried out by a digital ink system, such as digital ink system 124 of FIG. 1, and can be implemented in software, firmware, hardware, or combinations thereof. Process 400 is shown as a set of acts and is not limited to the order shown for performing the operations of the various acts. Process 400 is an example process for adding digital ink to a markup language document; additional discussions of adding digital ink to a markup language document are included herein with reference to different figures.

In process 402, digital ink user input for a markup language document is received (act 402). The digital ink user input is digital ink input by a user (e.g., by moving an object across a touchscreen, touchpad, or other input device as discussed above, moving a mouse or other cursor control device, and so forth). The digital ink user input is digital ink that is to be included in a markup language document.

A digital ink markup language element that includes data describing the digital ink user input is generated (act 404). This digital ink markup language element can be, for example, an "ink" element as discussed above. Alternatively, in situations in which a digital ink markup language element for the markup language document has already been generated, act 404 need not be repeated (e.g., the data describing the digital ink user input can be added to the previously generated digital ink markup language element).

The digital ink is embedded in the markup language document (406). The digital ink is embedded in the markup language document by adding the digital ink markup language element generated in act 404 to the markup language document. Alternatively, if no digital ink markup language element is generated in act 404 because the digital ink markup language element already exists, then the digital ink is embedded in the markup language document by adding the data describing the digital ink user input to the previously generated digital ink markup language element.

The markup language document is transmitted to a storage device (act 408). The storage device can be a local storage device (e.g., included as part of the same computing device that includes the digital ink system implementing the process 400), or a remote storage device (e.g., accessed via a network).

Returning to FIG. 1, the digital ink display module 128 manages the display of digital ink embedded in documents. The digital ink display module 128 extracts from a markup language document the various data describing content to be displayed, and displays the content via the output module 120. The digital ink display module 128 understands the different markup language elements used in the document, and extracts the data from those elements. For example, the digital ink display module extracts the data describing the digital ink in the digital ink markup language element of Table II or Table III above, and draws a digital ink stroke that includes the locations indicated in the digital ink markup language element. By way of another example, the digital ink display module extracts the data describing the text at line 18 of Table III, and displays that extracted text. If a timestamp of the digital ink strokes is included in the document, then the digital ink display module optionally displays the digital ink at a same timing or rate as the digital ink user input was received. E.g., if the digital ink user input was received over a time period of five seconds, the digital ink is displayed over a five-second time period as if the digital ink were being input at the time of display.

Figure 5:
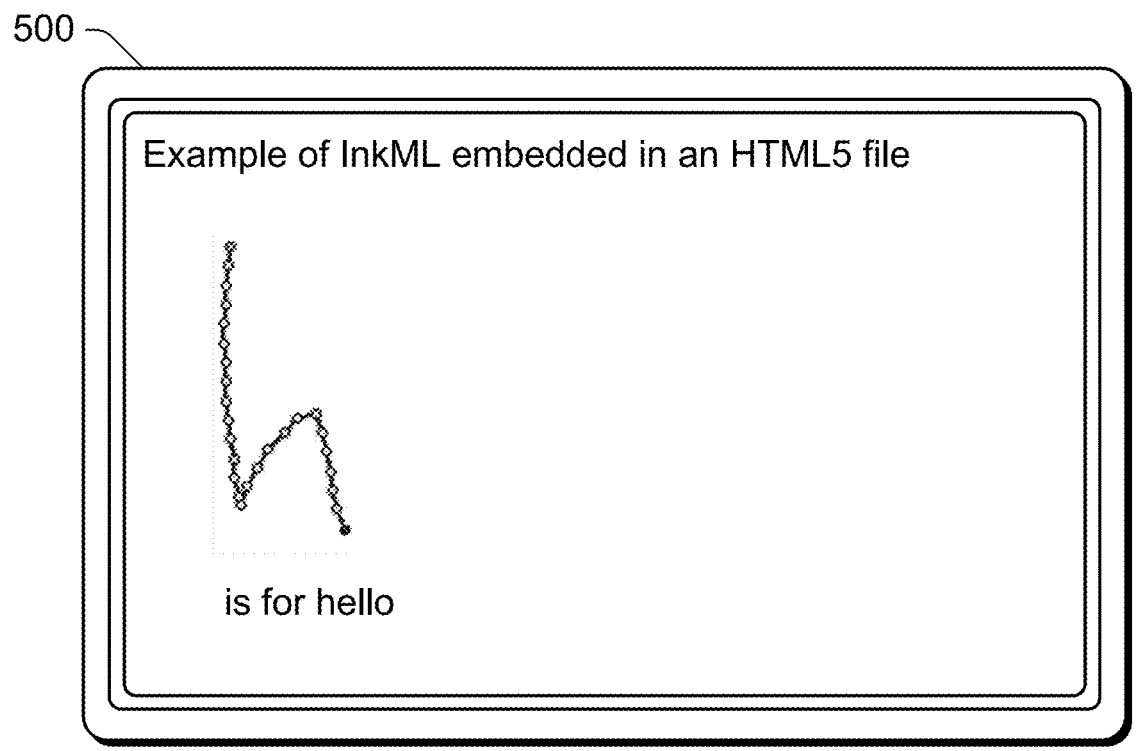
FIG. 5 illustrates an example of displaying a document including embedded digital ink in accordance with one or more embodiments.

FIG. 5 illustrates an example of displaying a document including embedded digital ink in accordance with one or more embodiments. FIG. 5 illustrates an example display 500 in which digital ink and additional data are displayed. FIG. 5 illustrates an example of displaying the document of Table III above. As illustrated, the text content "Example of InkML embedded in an HTML5 file" is displayed as a header, the digital ink content that is the letter "h" is displayed, and the additional content that is the text "is for hello" is also displayed.

Figure 6:
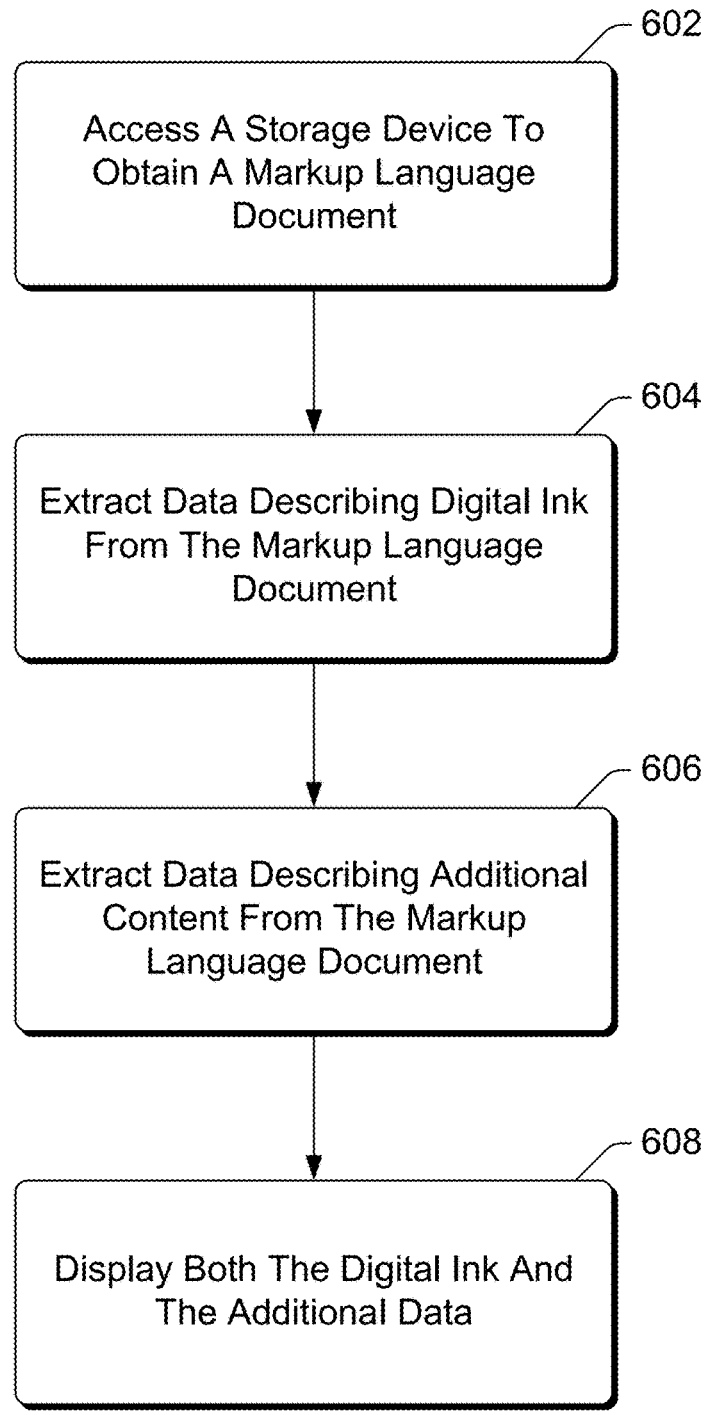
FIG. 6 is a flowchart illustrating an example process for displaying a markup language document with embedded digital ink in accordance with one or more embodiments.

FIG. 6 is a flowchart illustrating an example process 600 for displaying a markup language document with embedded digital ink in accordance with one or more embodiments. Process 600 is carried out by a digital ink system, such as digital ink system 124 of FIG. 1, and can be implemented in software, firmware, hardware, or combinations thereof. Process 600 is shown as a set of acts and is not limited to the order shown for performing the operations of the various acts. Process 600 is an example process for displaying a markup language document with embedded digital ink; additional discussions of displaying a markup language document with embedded digital ink are included herein with reference to different figures.

In process 600, a storage device is accessed to obtain a markup language document (act 602). The storage device can be a local storage device (e.g., included as part of the same computing device that includes the digital ink system implementing the process 600), or a remote storage device (e.g., accessed via a network).

Data describing digital ink embedded in the markup language document is extracted from the markup language document (act 604). The data describing the digital ink is extracted by identifying the digital ink markup language element including the data and providing the identified data to an output module for display of the digital ink.

Data describing additional content included in the markup language document is also extracted from the markup language document (act 606). The data describing the additional content is extracted by identifying the markup language element including the additional data and providing the additional data to an output module for display or other presentation (e.g., audible playback) of the additional content.

Both the digital ink and the additional content are displayed (act 608). Alternatively, in some situations the additional content is presented in manners other than being displayed, such as playback of audio content.

Returning to FIG. 1, the copy and paste system 122 of the operating system 112 supports digital ink embedded in markup language documents. The copy and paste system 122 understands the digital ink markup language element in the markup language document, and allows the digital ink markup language element to be copied from one document and pasted to another. By way of example, a user can select a portion of the content displayed from a first document, the selected portion including the digital ink, and input a copy request. In response, the copy and paste system 122 stores the markup language elements (or portions thereof) that include the selected portion to a clipboard or other memory. The user can then identify a location in a second document (or alternatively the first document) and input a paste request. The second document can be a document opened and used by the same application that opened the first document, or a different application. In response to the paste request, the copy and paste system 122 provides the data from the clipboard or other memory to the application that opened the second document, and that application incorporates the markup language elements into the second document. For example, the digital ink markup language element including the data describing selected digital ink is embedded in the second document.

In one or more embodiments, the digital ink system 124 employs one or more of various additional mechanisms to facilitate usage of the digital ink and embedding of the digital ink in markup language documents. These additional mechanisms are described below, and the digital ink system 124 can employ any one or any combination of these mechanisms. In one or more embodiments, the digital ink system 124 employs all of these mechanisms, although alternatively the digital ink system 124 employs fewer than all of these mechanisms.

One mechanism employed by the digital ink system 124 is the preservation of z-order. The z-order refers to which content is above or below which other content in a user interface, with content that is above or on top of other content possibly obscuring at least some of that other content. The digital ink system 124 records in the markup language document an indication of the z-order of content so that the z-order is maintained. This indication can be included in the markup language document in different manners, such as based on the order in which the markup language elements including the data describing the content are displayed (e.g., content that is on top of other content is located after that other content in the markup language document). Preserving the z-order allows, for example, the situation where if a user inputs text typing over an ink stroke, the text is displayed on top of or above the ink stroke.

One mechanism employed by the digital ink system 124 is managing out of bound digital ink. In scenarios in which digital ink can be input in only particular areas (e.g., an edit box as discussed above), the digital ink system 124 manages situations in which the user input extends beyond the boundaries of the particular area. In one or more embodiments, in situations in which a digital ink user input begins within the particular area and then goes out of the particular area, the digital ink system 124 collects all of the locations where the object was detected, but displays only those portions of the digital ink user input that were inside the particular area. This allows, for example, recognition operations to be performed on all of the digital ink user input even though all of the digital ink is not displayed.

In situations in which an object is touching locations outside of the particular area and then the object is moved to a location within the particular area, the movement of the object is not treated as a digital ink user input. Alternatively, the movement can be treated as a digital ink user input, but the digital ink system 124 displays only those portions of the digital ink that are within the particular area.

One mechanism employed by the digital ink system 124 is positioning digital ink. The digital ink system 124 allows the digital ink stroke to be positioned in various locations on a display in a manner analogous to text, pictures, or other content in the document. For example, the digital ink can be positioned using CSS position properties. In contrast to the digital ink being treated as an overlay, the digital ink is positioned analogous to other content in the document. The digital ink can be accounted for in document reflow or layout determinations, analogous to text, pictures, or other content in the document. The positioning of other content can thus be determined or changed based on the presence of the digital ink stroke (e.g., other content can be wrapped around or displayed adjacent to the digital ink stroke), and the positioning of the digital ink stroke can be determined or changed based on the presence of other content in the document.

One mechanism employed by the digital ink system 124 is hit test management. As the digital ink user input is received, the digital ink system 124 performs hit testing to determine whether the digital ink stroke intersects any other content of the document (and thus allowing the z-order to be preserved). In situations in which the digital ink is input in a particular area (e.g., an edit box as discussed above), the digital ink system 124 prevents the digital ink from occupying the entire particular area. This prevention can be implemented, for example, by ignoring or deleting the digital ink user input in response to the digital ink user input occupying the entire particular area.

Additionally, the digital ink system 124 prevents the digital ink user input from blocking any intractable object behind it. An intractable object refers to an object (content) that is not to be covered by other content. This prevention can be implemented, for example, by ignoring or deleting the digital ink user input in response to the digital ink user input being on top of the intractable object, or by changing the z-order so that the digital ink stroke is below the intractable object.

One mechanism employed by the digital ink system 124 is wet ink management. In situations in which the digital ink stroke is displayed on the same device as the digital ink user input is received (e.g., a touchscreen), the digital ink system 124 manages the digital ink stroke so that it remains close to the object generating the stroke (e.g., the tip of the pen, the tip of the user's finger). This provides the appearance to the user of the object being the source of the digital ink (e.g., analogous to ink or graphite being applied to paper by a pen or pencil).

In one or more embodiments, the computing device 102 supports multi-threading operations. The application 114 is run on the computing device as one or more processes, each of which includes one or more threads (also referred to as program threads). A thread refers to a sequence of instructions that can be managed, scheduled, and run independently by the operating system 112. The digital ink system 124 optionally creates (or uses existing) one or more threads for receiving the digital ink user input and displaying the digital ink stroke, and those one or more threads are separate from one or more additional threads that display other content in the document (and optionally treated as higher priority level threads than those one or more additional threads that display other content in the document). The digital ink system 124 also optionally creates (or uses existing) one or more threads for receiving the digital ink user input and displaying the digital ink stroke, and those one or more threads are separate from one or more additional threads that embed the digital ink in the markup language document. This use of multiple threads allows the digital ink stroke to be displayed more quickly than if other content were displayed using the same thread as displayed the digital ink stroke.

One mechanism employed by the digital ink system 124 is editing operation support. The digital ink system 124 supports various different digital ink editing operations, such as an undo operation to undo a digital ink user input, a redo operation to redo a digital ink input operation, an erase operation to erase digital ink, a selection operation to select digital ink, and so forth. User inputs specifying these different operations can be received in any of a variety of manners as discussed above.

The digital ink system 124 performs the proper operation on the digital ink embedded in the markup language document based on the user input. For example, if a digital ink user input is received and then an undo operation is received, the digital ink system 124 removes (e.g., deletes) from the markup language document the digital ink markup language element that was added in response to the digital ink user input (although the digital ink system 124 can maintain a copy of the deleted digital ink markup language element in memory). If a redo operation is then received, then the digital ink system 124 re-adds the digital ink markup language element to the markup language document. By way of another example, if an erase operation is received indicating to erase a portion of the digital ink, the digital ink system 124 deletes from the digital ink markup language element the locations of the digital ink corresponding to the portion to be erased.

One mechanism employed by the digital ink system 124 is digital ink characteristics support. The digital ink can have various different characteristics, such as width (also referred to brush width, as if the object used to generate the digital ink were a paint brush), shape, color, and so forth. The digital ink system 124 receives user inputs specifying the digital ink characteristics, allowing the user to specify the characteristics he or she desires. These user inputs can be received in any of a variety of manners as discussed above.

The digital ink system 124 includes, in the markup language document, an indication of the characteristics of the digital ink. This indication can be included in the markup language document in various manners. For example, one or more characteristics elements can be added to the digital ink markup language element discussed above. E.g., the digital ink markup language element includes a "trace" element that identifies the locations of the ink stroke at various times as discussed above. Similar elements can be included in the digital ink markup language element to identify other characteristics of the digital ink. For example, a "brush" element can be included to identify the shape, color, and width of the digital ink.

One mechanism employed by the digital ink system 124 is digital ink recognition support. The digital ink input by the user oftentimes represents particular text, such as letters, numbers, or other characters, also referred to as the semantic meaning of the digital ink. The digital ink system 124 facilitates recognizing this text, performing the recognition itself or providing an indication of the identified locations of the ink stroke at various times to another module or system to perform the recognition. The recognition of the text can be performed using any of a variety of public or proprietary techniques.

The digital ink system 124 includes, in the markup language document, an indication of the identified text. This indication can be included in the markup language document in various manners. For example, one or more semantic meaning elements can be added to the digital ink markup language element discussed above. E.g., the digital ink markup language element includes a "trace" element that identifies the locations of the ink stroke at various times as discussed above. A similar element can be included in the digital ink markup language element to identify the semantic meaning of the digital ink. For example, a "semantic meaning" element can be included to identify the recognized text.

The techniques discussed herein thus provide a mechanism allowing digital ink to be embedded in a markup language document. The embedding of the digital ink in the markup language document allows all of the content to be presented for the document to be included in a single file, reducing storage overhead on storage devices and reducing bandwidth usage when transferring the file.

The embedding of the digital ink in the markup language document also avoids the need to use an overlay layer. An overlay layer refers to a transparent layer on top of the user interface that collects the digital ink user inputs, and those collected digital ink user inputs are kept separate from the markup language document (and are typically stored in a separate file). However, no such overlay layer need be used with the techniques discussed herein. Avoiding the overlay layer provides access to all of the digital ink data (e.g., all of the trace elements) by the application or operating system, for example native HTML document object model (DOM) access to all of the digital ink data. The digital ink data (e.g., the digital ink markup language element or even the individual trace (or other data) elements) can be accessed and positioned as desired by the application, such as by using standard CSS properties or styles. Furthermore, the proper z-order for digital ink can be maintained, allowing some digital ink to be displayed on top of some content but below other content—by embedding the digital ink in the markup language document all of the digital ink need not be treated in the same manner.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 7:
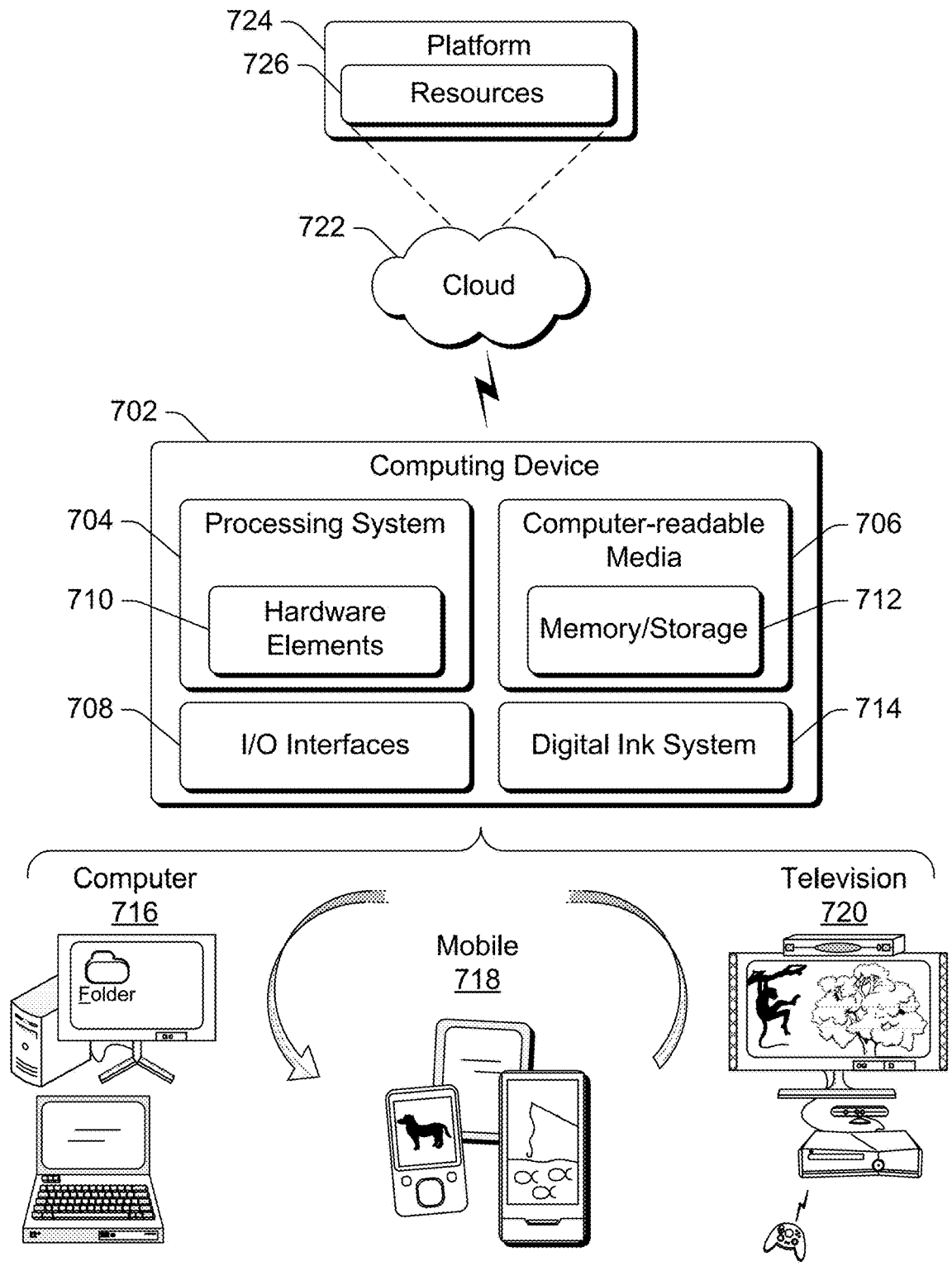
FIG. 7 illustrates an example system that includes an example computing device that is representative of one or more systems and/or devices that may implement the various techniques described herein.

FIG. 7 illustrates an example system generally at 700 that includes an example computing device 702 that is representative of one or more systems and/or devices that may implement the various techniques described herein. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

The one or more input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

The computing device 702 also includes a digital ink system 714. The digital ink system 714 provides various support for embedding digital ink in markup language documents as discussed above. The digital ink system 714 can implement, for example, the digital ink system 124 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules as a module that is executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 702 may assume a variety of different configurations, such as for computer 716, mobile 718, and television 720 uses. Each of these configurations includes devices that may have generally different constructs and capabilities, and thus the computing device 702 may be configured according to one or more of the different device classes. For instance, the computing device 702 may be implemented as the computer 716 class of a device that includes a personal computer, desktop computer, a multi-screen computer, laptop computer, netbook, and so on.

The computing device 702 may also be implemented as the mobile 718 class of device that includes mobile devices, such as a mobile phone, portable music player, portable gaming device, a tablet computer, a multi-screen computer, and so on. The computing device 702 may also be implemented as the television 720 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. This functionality may also be implemented all or in part through use of a distributed system, such as over a "cloud" 722 via a platform 724 as described below.

The cloud 722 includes and/or is representative of a platform 724 for resources 726. The platform 724 abstracts underlying functionality of hardware (e.g., servers) and software resources of the cloud 722. The resources 726 may include applications and/or data that can be utilized while computer processing is executed on servers that are remote from the computing device 702. Resources 726 can also include services provided over the Internet and/or through a subscriber network, such as a cellular or Wi-Fi network.

The platform 724 may abstract resources and functions to connect the computing device 702 with other computing devices. The platform 724 may also serve to abstract scaling of resources to provide a corresponding level of scale to encountered demand for the resources 726 that are implemented via the platform 724. Accordingly, in an interconnected device embodiment, implementation of functionality described herein may be distributed throughout the system 700. For example, the functionality may be implemented in part on the computing device 702 as well as via the platform 724 that abstracts the functionality of the cloud 722.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method comprising: receiving, by an application, digital ink user input for a markup language document; generating a digital ink markup language element that includes data describing the digital ink user input; embedding the digital ink markup language element in the markup language document, the markup language document also including in one or more additional elements additional data describing additional content to be displayed when displaying the markup language document, to allow the data describing the digital ink user input and the additional data describing additional content to be included in a single file; and transmitting the markup language document with the digital ink markup language element to a storage device.

Alternatively or in addition to any of the above described methods, any one or combination of: the method further comprising accessing a service via a data network, and obtaining the markup language document from the service; the method further comprising receiving a user request to copy a portion of the markup language document, the portion including at least some of the digital ink, and providing, in response to the user request, at least a portion of the digital ink markup language element to a copy and paste system; the method further comprising receiving a user request to paste content into the markup language document, the content to be pasted including data describing additional digital ink, and embedding the additional digital ink in the markup language document; the method further comprising preserving, in the markup language document, the z-order of the digital ink and the additional content; the application displaying an edit box in which digital ink is to be input, the digital ink user input including both multiple locations within the edit box and multiple locations beyond the edit box, the method further comprising including, in the digital ink markup language element, data identifying both the multiple locations within the edit box and the multiple locations beyond the edit box, and displaying, as a digital ink stroke for the digital ink user input, only the multiple locations within the edit box; the method further comprising using a first one or more program threads to receive the digital ink user input and display a digital ink stroke for the digital ink user input, and using a second one or more program threads to display the additional content; the method further comprising receiving, after receiving the digital ink user input, a first user request to undo the digital ink user input, and removing, in response to the first user request, the digital ink markup language element from the markup language document; the method further comprising receiving, after receiving the first user request to undo the digital ink user input, a second request to redo the digital ink user input, and adding, in response to the second user request, the digital ink markup language element back into the markup language document; the method further comprising receiving, after receiving the digital ink user input, a user request to erase a portion of the digital ink, and deleting, from the digital ink markup language element, data identifying locations of the digital ink corresponding to the portion; the method further comprising receiving a user inputs specifying characteristics of the digital ink, the characteristics including one or more characteristics selected from the group including: shape, color, and width, and adding, in the digital ink markup language element, an additional element that identifies the user specified characteristics of the digital ink; the method further comprising recognizing one or more characters represented by the digital ink user input, and adding, in the digital ink markup language element, an additional element that identifies the recognized one or more characters, an identification of a user that provided the digital ink user input, and a timestamp of digital ink strokes of the digital ink user input.

A method comprising: accessing a storage device to obtain a markup language document, the markup language document including a digital ink markup language element as well as one or more additional elements including additional data; extracting, from the digital ink markup language element, data describing digital ink of the markup language document; extracting, from the one or more additional elements, the additional data describing additional content of the markup language document; and displaying, as a visual representation of the markup language document, the digital ink as well as the additional content.

Alternatively or in addition to any of the above described methods, the accessing the storage device comprising accessing the storage device via a data network.

A computing device comprising: a processing system comprising one or more processors; one or more computer-readable storage media having stored thereon multiple instructions that, responsive to execution by the processing system, cause the processing system to perform acts comprising: receiving, by an application of the computing device, a user input indicating digital ink for a first markup language document; generating a digital ink markup language element that includes data describing the digital ink; embedding the digital ink markup language element in the first markup language document, the markup language document also including in one or more additional elements additional data describing additional content to be displayed when displaying the first markup language document, to allow the data describing the digital ink user input and the additional data describing additional content to be included in a single file; and transmitting the first markup language document with the digital ink markup language element to a storage device.

Alternatively or in addition to any of the above described computing devices, any one or combination of: the acts further comprising accessing a service via the Internet, and obtaining the markup language document from the service; the acts further comprising accessing the storage device to obtain a second markup language document, the second markup language document including a digital ink markup language element as well as one or more additional elements including additional data, extracting, from the second digital ink markup language element of the second markup language document, data describing digital ink of the second markup language document, extracting, from the one or more additional elements of the second markup language document, the additional data describing additional content of the second markup language document, and displaying, as a visual representation of the second markup language document, the digital ink of the second markup language document as well as the additional content of the second markup language document; the one or more processors executing the application as multiple threads, and the acts further comprising using a first one or more program threads of the multiple threads to receive the digital ink user input and display a digital ink stroke for the digital ink, and using a second one or more program threads of the multiple threads to embed the digital ink in the first markup language document; the acts further comprising receiving a user request to copy a portion of the first markup language document, the portion including at least some of the digital ink, and providing, in response to the user request, at least a portion of the digital ink markup language element to a copy and paste system; the acts further comprising receiving a user request to paste content into the first markup language document, the content to be pasted including data describing additional digital ink, and embedding the additional digital ink in the markup language document.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
receiving, by an application, digital ink user input for a markup language document;
generating a digital ink markup language element that includes data describing the digital ink user input;
embedding the digital ink markup language element in the markup language document by adding the digital ink markup language element to the markup language document, the markup language document also including in one or more additional elements additional data describing additional content to be displayed when displaying the markup language document; and transmitting the markup language document with the digital ink markup language element to a storage device.

2. The method as recited in claim 1, further comprising:
accessing a service via a data network; and
obtaining the markup language document from the service.

3. The method as recited in claim 1, further comprising:
receiving a user request to copy a portion of the markup language document, the portion including at least some of the digital ink; and
providing, in response to the user request, at least a portion of the digital ink markup language element to a copy and paste system.

4. The method as recited in claim 1, further comprising:
receiving a user request to paste content into the markup language document, the content to be pasted including data describing additional digital ink; and
embedding the additional digital ink in the markup language document.

5. The method as recited in claim 1, further comprising preserving, in the markup language document, the z-order of the digital ink and the additional content.

6. The method as recited in claim 1, the application displaying an edit box in which digital ink is to be input, the digital ink user input including both multiple locations within the edit box and multiple locations beyond the edit box, the method further comprising:
including, in the digital ink markup language element, data identifying both the multiple locations within the edit box and the multiple locations beyond the edit box; and
displaying, as a digital ink stroke for the digital ink user input, only the multiple locations within the edit box.

7. The method as recited in claim 1, further comprising:
using a first one or more program threads to receive the digital ink user input and display a digital ink stroke for the digital ink user input; and
using a second one or more program threads to display the additional content.

8. The method as recited in claim 1, further comprising:
receiving, after receiving the digital ink user input, a first user request to undo the digital ink user input; and
removing, in response to the first user request, the digital ink markup language element from the markup language document.

9. The method as recited in claim 8, further comprising:
receiving, after receiving the first user request to undo the digital ink user input, a second request to redo the digital ink user input; and
adding, in response to the second user request, the digital ink markup language element back into the markup language document.

10. The method as recited in claim 1, further comprising:
receiving, after receiving the digital ink user input, a user request to erase a portion of the digital ink; and
deleting, from the digital ink markup language element, data identifying locations of the digital ink corresponding to the portion.

11. The method as recited in claim 1, further comprising:
receiving a user inputs specifying characteristics of the digital ink, the characteristics including one or more characteristics selected from the group including: shape, color, and width; and adding, in the digital ink markup language element, an additional element that identifies the user specified characteristics of the digital ink.

12. The method as recited in claim 1, further comprising:
recognizing one or more characters represented by the digital ink user input; and
adding, in the digital ink markup language element, an additional element that identifies the recognized one or more characters, an identification of a user that provided the digital ink user input, and a timestamp of digital ink strokes of the digital ink user input.

13. A method comprising:
accessing a storage device to obtain a markup language document, the markup language document including a digital ink markup language element as well as one or more additional elements including additional data;
extracting, from the digital ink markup language element, data describing digital ink of the markup language document, the data describing the digital ink comprising locations along a stroke of the digital ink;
extracting, from the one or more additional elements, the additional data describing additional content of the markup language document; and
displaying, as a visual representation of the markup language document, the digital ink as well as the additional content.

14. The method as recited in claim 13, the accessing the storage device comprising accessing the storage device via a data network.

15. A computing device comprising:
a processing system comprising one or more processors;
one or more computer-readable storage media having stored thereon multiple instructions that, responsive to execution by the processing system, cause the processing system to perform acts comprising:
receiving, by an application of the computing device, a user input indicating digital ink for a first markup language document;
generating a digital ink markup language element that includes data describing the digital ink;
embedding the digital ink markup language element in the first markup language document by adding the digital ink markup language element to the first markup language document, the markup language document also including in one or more additional elements additional data describing additional content to be displayed when displaying the first markup language document; and
transmitting the first markup language document with the digital ink markup language element to a storage device.

16. The computing device as recited in claim 15, the acts further comprising:
accessing the storage device to obtain a second markup language document, the second markup language document including a digital ink markup language element as well as one or more additional elements including additional data;
extracting, from the second digital ink markup language element of the second markup language document, data describing digital ink of the second markup language document;
extracting, from the one or more additional elements of the second markup language document, the additional data describing additional content of the second markup language document; and displaying, as a visual representation of the second markup language document, the digital ink of the second markup language document as well as the additional content of the second markup language document.

17. The computing device as recited in claim 15, the one or more processors executing the application as multiple threads, and the acts further comprising:

using a first one or more program threads of the multiple threads to receive the digital ink user input and display a digital ink stroke for the digital ink; and using a second one or more program threads of the multiple threads to embed the digital ink in the first markup language document.

18. The computing device as recited in claim 15, the acts further comprising:

receiving a user request to copy a portion of the first markup language document, the portion including at least some of the digital ink; and providing, in response to the user request, at least a portion of the digital ink markup language element to a copy and paste system.

19. The computing device as recited in claim 15, the acts further comprising:

receiving a user request to paste content into the first markup language document, the content to be pasted including data describing additional digital ink; and embedding the additional digital ink in the markup language document.

20. The method as recited in claim 1, the data describing the digital ink user input comprising locations along a stroke of the digital ink user input.

\* \* \* \* \*